United States Patent

[11] 3,621,282

[72] Inventor Charles H. Haas
Edgewater, Md.
[21] Appl. No. 22,962
[22] Filed Mar. 26, 1970
[45] Patented Nov. 16, 1971
[73] Assignee The United States of America as represented by the Secretary of the Navy

[54] SAWTOOTH GENERATOR WITH A RAMP-BIAS VOLTAGE COMPARATOR
1 Claim, 2 Drawing Figs.

[52] U.S. Cl. .......... 307/228, 328/183, 328/184, 330/30 D
[51] Int. Cl. .......... H03k 4/08
[50] Field of Search .......... 307/228; 328/181, 183, 184, 185; 330/30 D

[56] References Cited

UNITED STATES PATENTS 3,484,624 12/1969 Rasiel et al. .......... 328/185 X
3,450,898 6/1969 Malan .......... 307/229
3,278,737 10/1966 Germain .......... 307/228
3,198,963 8/1965 Halsted .......... 307/228

*Primary Examiner*—Donald D. Forrer
*Assistant Examiner*—R. C. Woodbridge
*Attorneys*—Richard S. Sciascia, George J. Rubens, John W. McLaren and Truman L. Styner

ABSTRACT: In a sawtooth generator the voltage ramp across a condenser is compared with a bias voltage source. The ramp and bias voltages are applied, respectively, to the two input terminals of a bistable comparator. When the two voltages are equal the comparator output voltage changes state suddenly to operate a first switch to discharge the condenser, and second switch to close a positive feedback circuit from the output to the input of the comparator to insure the reliable switching action. The result is a linear ramp repeated at regular intervals free of the vagaries of noise voltages in the system.

PATENTED NOV 16 1971 3,621,282

INVENTOR.
CHARLES H. HAAS
BY
ATTORNEYS

SAWTOOTH GENERATOR WITH A RAMP-BIAS VOLTAGE COMPARATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It is common in time-base or sawtooth generators to charge a condenser through a constant current source and to discharge the condenser through a switch. While the discharge switch is a transistor it must be operated by a pulse source; but this technique suffers from mistriggering of the switch because of noise, complexity of interaction of circuits and erratic parameters. If the instant of discharge of the condenser becomes erratic the repetition rate of the sawtooth cycle is unreliable.

STATEMENT OF THE OBJECTS OF THE INVENTION

The objects of this invention is to provide an improved sawtooth generator in which the ramp voltage is linear and recycles reliably.

A more specific object of this invention is to provide an improved sawtooth generator in which a condenser discharge transistor is turned on by a pulse from a source which is not vulnerable to noise.

SUMMARY OF THE INVENTION

A constant current source is connected to a storage condenser to generate a linear voltage ramp across the condenser. At a predetermined time a transistor switch connected across the condenser is closed to suddenly discharge the condenser. Each voltage ramp starts from a zero or a short-circuited potential. The discharge switch is operated by the output of a bistable voltage comparator, the two inputs of which are connected to a steady voltage bias source and to the condenser potential. When the voltage ramp equals or exceeds the bias the bistable comparator changes state suddenly applying an operating pulse to the switch. So that the switching operation will always occur at the same value of voltage on the ramp, and hence at regular intervals, assuring absolute linearity of the ramp, a positive feedback circuit is provided from the output to one of the inputs of the comparator. This circuit preferably consists of a switching diode properly polarized to normally remain open circuited and to saturate at the instant the input voltages of the comparator call for a change of state.

Figure 1:
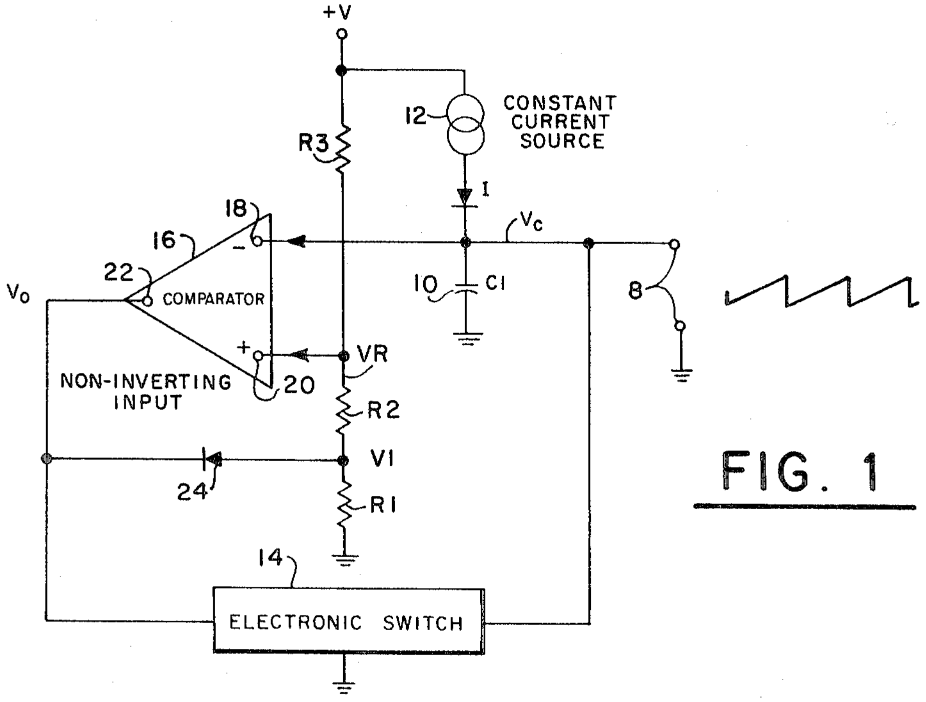
Figure 2:
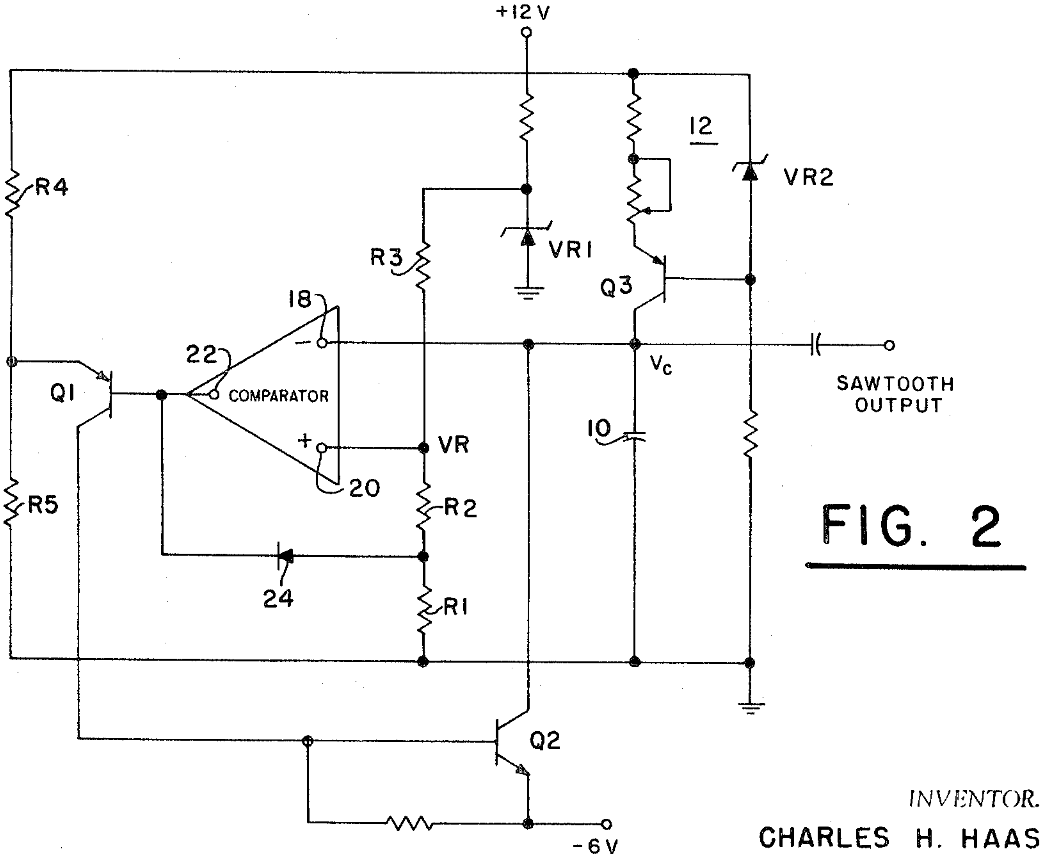

Other objects and features of this invention will occur to those skilled in the art by referring to specific embodiments described in the following specification and shown in the accompanying drawing in which:

FIG. 1 is a partial circuit diagram of the preferred embodiment of this invention, and FIG. 2 is a complete circuit diagram of the embodiment shown in FIG. 1.

In FIG. 1 a sawtooth voltage waveform is produced at the output terminals 8 which are connected directly across the terminals of the storage condenser 10. It has long been accepted that if the current of a voltage source across a condenser is kept constant the voltage across the condenser will increase linearly. The constant current source 12 is connected across the condenser 10, and will produce the voltage ramps shown.

The next main requisite of the sawtooth generator is that the ramp be suddenly reduced to the starting voltage at evenly spaced intervals. The electronic switch 14 is connected across the condenser and is intended to reset the condenser charge to zero.

The circuit for operating the switch comprises essentially the comparator 16. The comparator is preferably of the bistable differential type having two inputs and one output terminal. Input terminal 18 is connected directly to the ungrounded terminal of condenser 10 while input terminal 20 is connected to the point VR of the voltage divider consisting of resistance elements R1, R2, and R3 which in turn is connected across a bias source. In the embodiment illustrated the bias source is established between the positive voltage source and ground and contains the resistance elements of R1, R2, and R3. According to an important feature of this invention the switching diode 24 is coupled between the output and input of the comparator. The diode is so polarized and the input terminal so selected that the feedback is positive. In FIG. 1, output terminal 22 of the comparator is connected to point V1 and hence to point VR on the bias voltage divider.

While the parameters of the comparator may be chosen to accompany any value of bias and any range of voltage ramp, it is preferred, and has been adopted in practice, that the parameters permit the output potential of the comparator shift between −0.5 to +2.5 volts. At the instant the condenser voltage VC equals or exceeds the bias voltage VR, the output voltage VO changes to −0.5 volts. However, when VR is greater than VC, *VO=+2.5 v*. The switch 14 must, of course, remain open while the condenser is charging.

With switch 14 open, capacitor 10 charges linearly through the constant current source 12. As stated, when VC becomes equal to or exceeds VR, the comparator output switches from a positive to a negative potential. When this occurs, diode 24 becomes forward biased pulling down the voltage at V1, which, in turn, decreases the voltages VR. This represents positive feedback around the comparator and ensures that the comparator output switches to −0.5 volts. When the comparator switches to −0.5 volts, the comparator simultaneously closes the electronic switch 14 and discharges condenser 10. Since diode 24 is forward biased, the voltage at the junction V1 is essentially zero. The new reference voltage VR is now determined by the values of the resistive elements, R1, R2 and R3 of the voltage divider.

Capacitor 10 discharges through switch 14 until the capacitor voltage becomes less than VR, whereupon the comparator output switches back to +2.5 volts. Since diode 24 again becomes reversed the reference voltage VR assumes its original value. This operation represents positive feedback during switching and ensures that the comparator switches reliably. When the comparator output switches back to +2.5 volts, switch 14 opens and capacitor C1 begins to charge again whereupon the sawtooth cycle repeats. Both the starting and stopping voltages of the sawtooth ramp are stabilized thus insuring linearity and constant repetition rate.

In FIG. 2 is shown a more complete schematic diagram of a sawtooth generator similar to that of FIG. 1. In FIG. 2 the constant current of source 12 comprises the PNP transistor Q3 with the zener diode VR2 connected between the base and the bias source. The emitter-base bias varies to keep constant the current through the emitter-collector path of transistor.

In FIG. 2 the electronic switch comprises the transistor Q2, the base of which is operated in the collector circuit of the amplifier transistor Q1. The emitter voltage of Q1 is so selected by the values of R4, R5 that the transistor is blocked when the output terminal 22 of the comparator is positive and is saturated when the base is negative. If the switching transducer Q2 is of the NPN type, as shown, the polarity inversions by the amplifier Q1 causes the switch Q2 to operate at the instant the comparator switches from one bistable condition to the other in the manner explained above in connection with FIG. 1. Diode 24 positively feeds back energy to shift the voltage VR in the direction to insure positive reversal of the comparator state at both the upper and lower end of each voltage ramp.

What is claimed is:

1. In a sawtooth generator having a storage condenser, a constant current source connected across said condenser for generating a linear voltage ramp, and switch means connected across said condenser for intermittently discharging said condenser, the combination comprising;

a direct current bias source, a bistable comparator with two input circuits connected, respectively, to said condenser and to said direct current source, said comparator having an output circuit, said output circuit being connected to said switch means for operating said switch when the condenser ramp voltage exceeds a predetermined proportion of said bias, a voltage divider connected across said direct current source, a connection between a first point on said voltage divider and one input circuit of said comparator, and a diode being connected between said output circuit of the comparator and a second point on said voltage divider so that a difference in potential exists between said first and second points and a change in potential of the second point will change the potential at the first point.

* * * * *